US010410255B2

(12) United States Patent
Kamath (10) Patent No.: US 10,410,255 B2
(45) Date of Patent: Sep. 10, 2019

(54) METHOD AND APPARATUS FOR ADVERTISING BIDDING

(71) Applicant: Adobe Systems Incorporated, San Jose, CA (US)

(72) Inventor: Anil Kamath, Palo Alto, CA (US)

(73) Assignee: Adobe Inc., San Jose, CA (US)

( * ) Notice: Subject to any disclaimer, the term of this patent is extended or adjusted under 35 U.S.C. 154(b) by 1727 days.

(21) Appl. No.: 13/905,412

(22) Filed: May 30, 2013

(65) Prior Publication Data

US 2013/0262219 A1 Oct. 3, 2013

Related U.S. Application Data (63) Continuation of application No. 12/973,680, filed on Dec. 20, 2010, now Pat. No. 8,489,460, which is a continuation-in-part of application No. 10/773,653, filed on Feb. 6, 2004, now Pat. No. 7,870,017, said application No. 13/905,412 is a continuation-in-part of application No. 12/884,828, filed on Sep. 17, 2010, now abandoned.

(60) Provisional application No. 60/450,597, filed on Feb. 26, 2003, provisional application No. 61/243,873, filed on Sep. 18, 2009.

(51) Int. Cl.
*G06Q 30/02* (2012.01)
*G06Q 30/08* (2012.01)

(52) U.S. Cl.
CPC ......... *G06Q 30/0275* (2013.01); *G06Q 30/02* (2013.01); *G06Q 30/0244* (2013.01); *G06Q 30/0269* (2013.01); *G06Q 30/08* (2013.01)

(58) Field of Classification Search
None
See application file for complete search history.

(56) References Cited

U.S. PATENT DOCUMENTS

| | | | |
|---|---|---|---|
| 6,199,050 B1 * | 3/2001 | Alaia | G06Q 30/0601 705/1.1 |
| 6,285,987 B1 | 9/2001 | Roth et al. | |
| 6,408,283 B1 | 6/2002 | Alaia et al. | |
| 6,499,018 B1 | 12/2002 | Alaia et al. | |
| 6,792,399 B1 * | 9/2004 | Phillips | G06Q 10/06 705/36 R |
| 6,907,566 B1 | 6/2005 | McElfresh et al. | |
| 7,035,812 B2 | 4/2006 | Meisel et al. | |
| 7,065,500 B2 * | 6/2006 | Singh | G06F 17/30864 705/20 |
| 7,363,300 B2 * | 4/2008 | Davis | G06F 17/30864 |

(Continued)

FOREIGN PATENT DOCUMENTS

| | | |
|---|---|---|
| JP | 2003216864 | 7/2003 |
| WO | WO 2001003041 | 1/2001 |
| WO | WO 2004084109 | 9/2004 |

OTHER PUBLICATIONS

Final Office Action from related U.S. Appl. No. 12/884,828 dated Oct. 20, 2015, 22 pages.

(Continued)

*Primary Examiner* — Thomas L Mansfield
(74) *Attorney, Agent, or Firm* — Kilpatrick Townsend & Stockton LLP (57) ABSTRACT

Methods, articles, and systems for determining a bidding strategy for on-line query answer set or contextual advertisement positions for marketing options is described herein.

20 Claims, 4 Drawing Sheets

(56) References Cited

U.S. PATENT DOCUMENTS

| | | | |
|---|---|---|---|
| 7,406,436 B1* | 7/2008 | Reisman | G06Q 30/02 705/7.32 |
| 7,424,457 B2* | 9/2008 | Khaishgi | G06Q 10/10 705/26.1 |
| 7,870,017 B2 | 1/2011 | Kamath | |
| 8,489,460 B2 | 7/2013 | Kamath | |
| 2002/0004735 A1* | 1/2002 | Gross | G06Q 30/0214 705/26.41 |
| 2003/0033292 A1* | 2/2003 | Meisel | G06F 17/30864 |
| 2003/0220866 A1 | 11/2003 | Pisaris-Henderson et al. | |
| 2004/0054572 A1* | 3/2004 | Oldale | G06F 17/30699 706/1 |
| 2004/0225562 A1 | 11/2004 | Turner et al. | |
| 2005/0071218 A1 | 3/2005 | Lin et al. | |
| 2005/0144068 A1 | 6/2005 | Calabria et al. | |
| 2005/0216516 A1 | 9/2005 | Calistri-Yeh et al. | |
| 2007/0100708 A1 | 5/2007 | Smith et al. | |
| 2007/0214133 A1 | 9/2007 | Liberty et al. | |
| 2007/0255690 A1 | 11/2007 | Chang et al. | |
| 2008/0010144 A1 | 1/2008 | Chatwin et al. | |
| 2008/0097830 A1* | 4/2008 | Kim | G06Q 30/02 705/14.4 |
| 2008/0103892 A1 | 5/2008 | Chatwin et al. | |
| 2008/0114639 A1 | 5/2008 | Meek et al. | |
| 2008/0249844 A1 | 10/2008 | Abe et al. | |
| 2008/0255915 A1 | 10/2008 | Collins et al. | |
| 2008/0255925 A1 | 10/2008 | Vailaya et al. | |
| 2009/0055139 A1 | 2/2009 | Agarwal et al. | |
| 2009/0327083 A1 | 12/2009 | Mathew et al. | |
| 2010/0138291 A1 | 6/2010 | Silverman et al. | |
| 2010/0257058 A1 | 10/2010 | Karidi et al. | |
| 2010/0306161 A1 | 12/2010 | Chen et al. | |
| 2011/0047025 A1 | 2/2011 | Demir et al. | |
| 2011/0087542 A1 | 4/2011 | Kamath | |
| 2012/0036009 A1 | 2/2012 | Aronowich et al. | |

OTHER PUBLICATIONS

Non final Office Action from related U.S. Appl. No. 12/884,828 dated Mar. 18, 2015, 18 pages.

International Search Report in Related PCT/US2011/065995, dated Aug. 24, 2012, 11 pages.

Lee et al., "Analysis and Visualization of Metrics for Online Merchandising", WEBKDD '99, LNAI 1836, pp. 126-141, 2000.

Ward, et al., "Internet Shopping, Consumer Search and Product Branding", Department of Agricultural and Consumer Economics, University of Illinois, Urbana—Champaign, Jul. 1999.

International Search Report for Application PCT/US2010/049332, dated Jun. 3, 2011.

Final Office Action in related U.S. Appl. No. 12/884,828, dated Feb. 14, 2013, 51 pages.

Non Final Office Action in related U.S. Appl. No. 13/618,827 dated Nov. 30, 2012, 40 pages.

Final Office Action in related U.S. Appl. No. 13/618,827, dated Sep. 12, 2013, 13 pages.

Non Final Office Action in related U.S. Appl. No. 12/884,828, dated Nov. 18, 2016, 39 pages.

* cited by examiner

Budget/Revenue Relationship Visualization 210

METHOD AND APPARATUS FOR ADVERTISING BIDDING

RELATED APPLICATIONS

This application is a continuation of U.S. patent application Ser. No. 12/973,680, filed on Dec. 20, 2010, titled "Method and Apparatus for Advertising Bidding," which is a continuation-in-part of U.S. patent application Ser. No. 10/773,653, filed Feb. 6, 2004, titled "Method and Apparatus for Position Bidding," which claims the benefit of U.S. Provisional Application No. 60/450,597, filed on Feb. 26, 2003, titled "Method and Apparatus for On-Line Query Answer Set Position Bidding," and also a continuation-in-part of U.S. patent application Ser. No. 12/884,828, titled "Advertisee-History-Based Bid Generation System and Method for Multi-Channel Advertising," filed Sep. 17, 2010, which claims the benefit of U.S. Provisional Application No. 61/243,873, filed Sep. 18, 2009, titled "Modeling and Optimal Bidding in a Real-Time Multi-Channel, Online Advertising Environment"; each of the aforementioned applications are herein incorporated by reference in their entirety.

TECHNICAL FIELD

The present invention relates generally to the fields of data processing and electronic advertising. More specifically, the present invention relates to on-line query answer set or contextual advertisement position bidding. On-line query answer set may also be referred to as on-line search result answer/return set.

BACKGROUND OF THE INVENTION

In conventional systems, marketing purchases (also referred to as advertisement buys) are typically optimized individually and performance measurement and purchase decisions are made separately for each marketing option. An organization can have a large number of available marketing options (advertisement buys) that are priced differently, and deliver different results. For example, search engines have paid listings, where the cost per click to bring a visitor from the search engine is different based on the keyword that the visitor on the search engine searched for and the position at which the advertisement is displayed. Similarly, most web sites have different charges for different contextual advertisement positions or for different audiences that are shown the advertisements.

Thus, an approach that enables a decision maker to make marketing purchase (advertisement buy) decisions, by allocating dollars across a portfolio of marketing options (advertisement buys) so as to meet specific composite goals and performance criteria, is desirable.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Embodiments of the present invention includes a system and its components that enable a decision maker to make marketing purchase (advertisement buy) decisions, by allocating dollars across a portfolio of marketing options (advertisement buys) so as to meet specific composite goals and performance criteria.

In the description to follow, embodiments of the present invention will be described using terminologies commonly employed by those skilled in the art to present their work, including but not limited to terms like web site, web pages, clicks, on-line query, search engine, answer set, modeling, regression analysis, optimization, objective functions, constraints, and so forth. These terms are to be accorded the common meaning as understood by those of the ordinary skill in the arts of information technology and applied mathematics.

Process Flow

In one embodiment, the process of the present invention may comprise the following operations:

Model

Optimize

Execute

Figure 1:
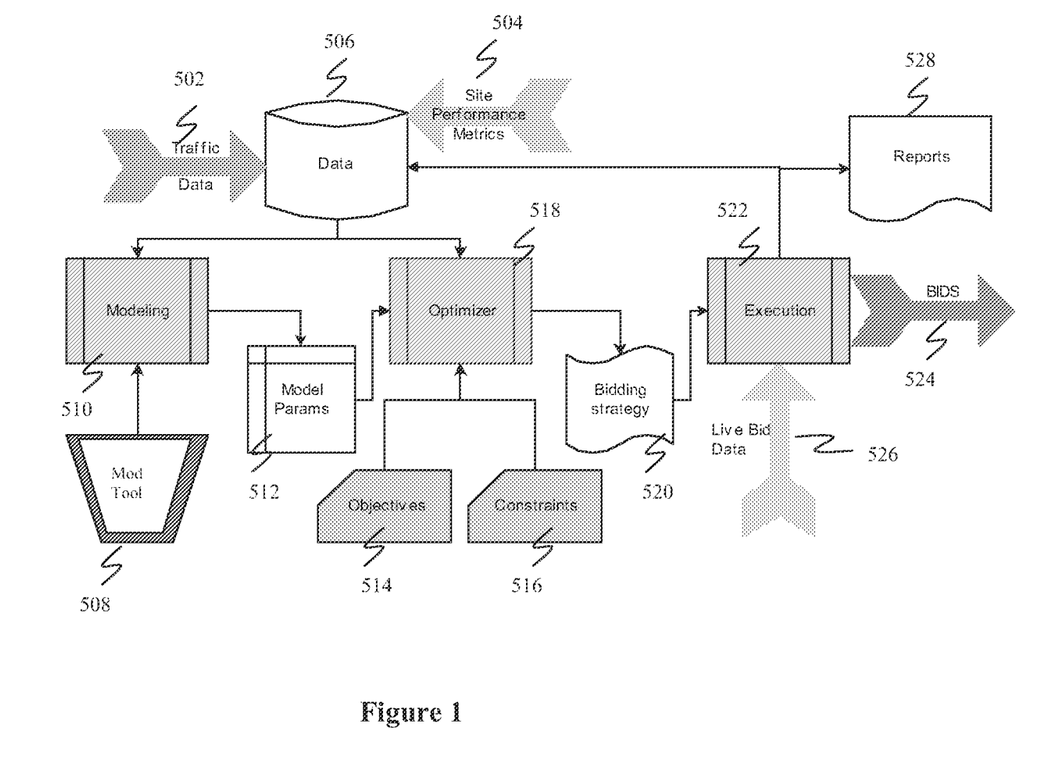
FIG. 1 is an overview illustrating the present invention according to one embodiment.

Each aspect will be described in turn, referencing FIG. 1.

Model

In one embodiment, the system may include modeling 510 for the different marketing options (advertisement buys) available to an organization. The modeling parameters 512 may include, but are not limited to a number of visitors, a cost of bringing the visitors, number of unique visitors, transactions, revenues generated by the visitors, and so forth. In various embodiments, the modeling parameters may also include information about visitors who may view the marketing options, such as, for example, demographic information, interests and likes, or behavioral information. In various embodiments, demographic information may include information such as age, gender, geographic location, employment, education, and/or membership in one or more groups. Thus, in various embodiments, bidding strategies which are based on models including demographic information may direct bids which maximize impressions by visitors that satisfy particular a demographic makeup. For example, a bidding strategy may seek to maximize impressions by residents of Los Angeles, or students at UCLA, or males between 18 and 34 years of age. In other embodiments, bidding strategies which are based on models including demographic information may direct bids which recognize value provided by showing advertisements to different demographic groups. For example, a bidding strategy may seek to maximize impressions by males between 18 and 34 years of age for a particular video game product, because the model incorporates knowledge that this group of viewers are more likely to cause a conversion than other groups. In other embodiments, the modeling parameters may include unique identifying information about one or more visitors. The models may comprise be statistical models based on measurable empirical data 506.

In one embodiment, the models are constructed by gathering empirical data 506 by purchasing the various marketing options for a limited period of time, and measuring the resulting clicks, visitors, transaction, revenues, and so forth 502 and 504. In various embodiments, the information may be tracked on a per-visitor basis that it may be combined with information identifying visitors or visitor demographics. Further, for the embodiment, a least mean squared fit over the empirical data may be performed to determine the expected values of the model parameters 512, using a modeling software 508 like AMPL (a modeling language for linear programming) or Splus (software for statistical modeling). For example, for the paid listings on search engines like Overture and Google, empirical data for different keywords at different positions may first be obtained, and then the ratio of clicks at position i to clicks at position i+1 through a least mean squared regression may be determined. Using this model, the traffic that can be generated at different positions and/or for different keywords may be inferred.

In various embodiments, models may be specified to determine model objectives for multiple sites or auctions. Thus, in some embodiments, a model may be used to determine different bidding strategies for different websites. In various embodiments, a model may comprise empirical data for multiple web sites in addition to data for particular positions within websites. Thus, a bidding strategy produced by solving an objective function for a model may produce different bid amounts for different web sites or auctions depending on those web sites' or auctions' ability to fulfill objectives, such as revenue, conversion rates, and others, as described herein. The bidding strategy may therefore result in bids for marketing options which are placed in different positions on different web sites. In various embodiments, models may be used to determine different bidding strategies for different audiences (e.g., viewers of advertisements may be differentiated based on their demographic information, interests, likes, and/or past behaviors). In some embodiments audience models may be combined with models for websites to determine different bidding strategies for different audiences seeing the ads at different websites.

In various embodiments, the models may include a click model that may forecast the number of clicks for the various on-line query answer set or contextual advertisement positions available from various search engines and/or web sites. Embodiments may include a cost model that may forecast costs of ad impressions or clicks for various audiences or websites and models. In various embodiments, the cost model may predict how different bid levels may result in different levels of spending on different audiences or websites due to different numbers of impressions and clicks on those audiences or websites. In other embodiments, models may include a revenue model that forecasts revenue based at least in part on click conversion. In various embodiments, models may include a model which forecasts conversions from clicks to purchases.

Optimize

In one embodiment, once the models for the different variables that are within the scope to improve or control, the models 510 may be specified to perform an optimization of measurable objectives 514 that have been modeled. In various embodiments, the measurable objectives may include number of unique visitors, number of transactions, revenues, profits, conversions, etc. In some embodiments, objectives may be generated by using some combination of marketing options. The specification may be effectuated through a variety of input techniques. In various embodiments, a graphical user interface is provided to specify the models 510, or more specifically, the model parameters and their relationships 512. The optimization of these objectives 514 may be subject to constraints 516 that involve controlling some other measurable modeled variables such as the money spent on marketing, certain minimum lead generation requirements, etc.

In various embodiments a graphical user interface may be configured to allow changes to model parameters, followed by re-optimization. Thus, a user of the graphical user interface may see be able to see changes to a bidding strategy take place dynamically as the user changes one or more model parameters. In various embodiments, these changes may be performed by repeating optimization of the model with the changed parameters.

The optimization problem may be modeled as a mathematical programming problem. In some embodiments, if all the models involved are linear models the optimization problem is a linear programming problem, which can be solved using a standard linear programming/optimization solver like CPLEX or MINOS 518. In other embodiments, the optimization problem may be formulated as a non-linear problem, and solved employing any one of a number of non-linear optimization techniques. The solution to the optimization problem can be a set of marketing purchase decisions or a market budget allocation strategy (also referred to as a bidding strategy) 520 that needs to be executed by the organization.

In various embodiments, the optimization may be performed with reference to a specific visitor or instance of a web site or auction. For example, in various embodiments, an optimization may be performed in response to a visitor requesting to view a website. In various embodiments, the optimization may then be performed in real time to determine a bidding strategy with respect to the particular visitor performing the request and/or the particular web site being requested.

Objective Functions

In various embodiments, the measurable goals (or objectives) 512 that may be used may be one or more of the following:

maximizing traffic (also referred to as clicks) for the marketing options for a given budget;

minimizing cost to get certain traffic for the marketing options;

minimizing customer or visitor acquisition cost for the products or services of the marketing options;

maximizing revenues for the products or services of the marketing options;

maximizing profits for the products or services after as a net of cost of the marketing options;

maximizing profit margins for the products or services as a net of cost of the marketing options;

minimizing marketing expenses for the marketing options;

maximizing increases of customer sign-ups or registrations for products or services of the marketing options;

minimizing cost measured on a per-conversion or per-purchase basis;

maximizing number of impressions that may be obtained by visitors which satisfy a given demographic makeup; and maximizing engagement with an advertisement or brand (e.g., getting "likes" on Facebook, "tweets" about the brand on twitter, views of the video ads etc.).

In alternate embodiments, other objective functions 512 may be employed in addition to or in lieu of the earlier enumerated objective functions.

Constraints

In various embodiments, constraints may be set and differing levels of granularity, from cost-per-conversion numbers, to budgets for entire advertising channels. In various embodiments, the measurable constraints on the marketing decisions may be one or more of the following enumerated constraints:

traffic to certain URLs (Uniform Resource Locators) should exceed certain amount during a certain period;
certain keywords should be at specified positions;
costs per click should not exceed a certain amount;
costs per conversion should not exceed a certain amount;
user acquisition costs should be below certain amount;
marketing expenses for the marketing options should be below a budget limit;
expenses for other marketing options or advertising channels other than those which are being optimized for is set at a particular limit;
revenues generated for products or services of the marketing options should be below a limit; and
profit margins net of marketing costs should be above a certain limit.

In alternative embodiments, measurable constrains may comprise other constraints in addition to or in lieu of the earlier enumerated constraints.

Execute

In various embodiments, the marketing strategy or spending decisions (bidding strategy) 520 may be implemented 522 to make bids 524. The implementation may also be monitored and adjusted 522 in the context of the changing marketing options available 526 and the changing objectives and requirements of the organization 514 and 516 (re-performing the earlier described optimization operation). For example, based on the availability of cheaper marketing options 526, a decision may be made to stop an advertising campaign at a specific site or for paid listings on search engines, the bid or the maximum cost per click that an organization presumably is willing to pay for a paid listing for a keyword, may be changed, based on the gross margins generated from transactions made by visitors clicking on that keyword listing. In various embodiments, the results of the implementations are captured as reports 528, and the data contained in the reports 528 are fed back to add to or update the empirical data employed to build the models 510. The models 510 may be updated, and inputs and/or constraints changed, and the optimization process 518 may be re-performed to yield one or more new bidding strategies 520.

Figure 2:
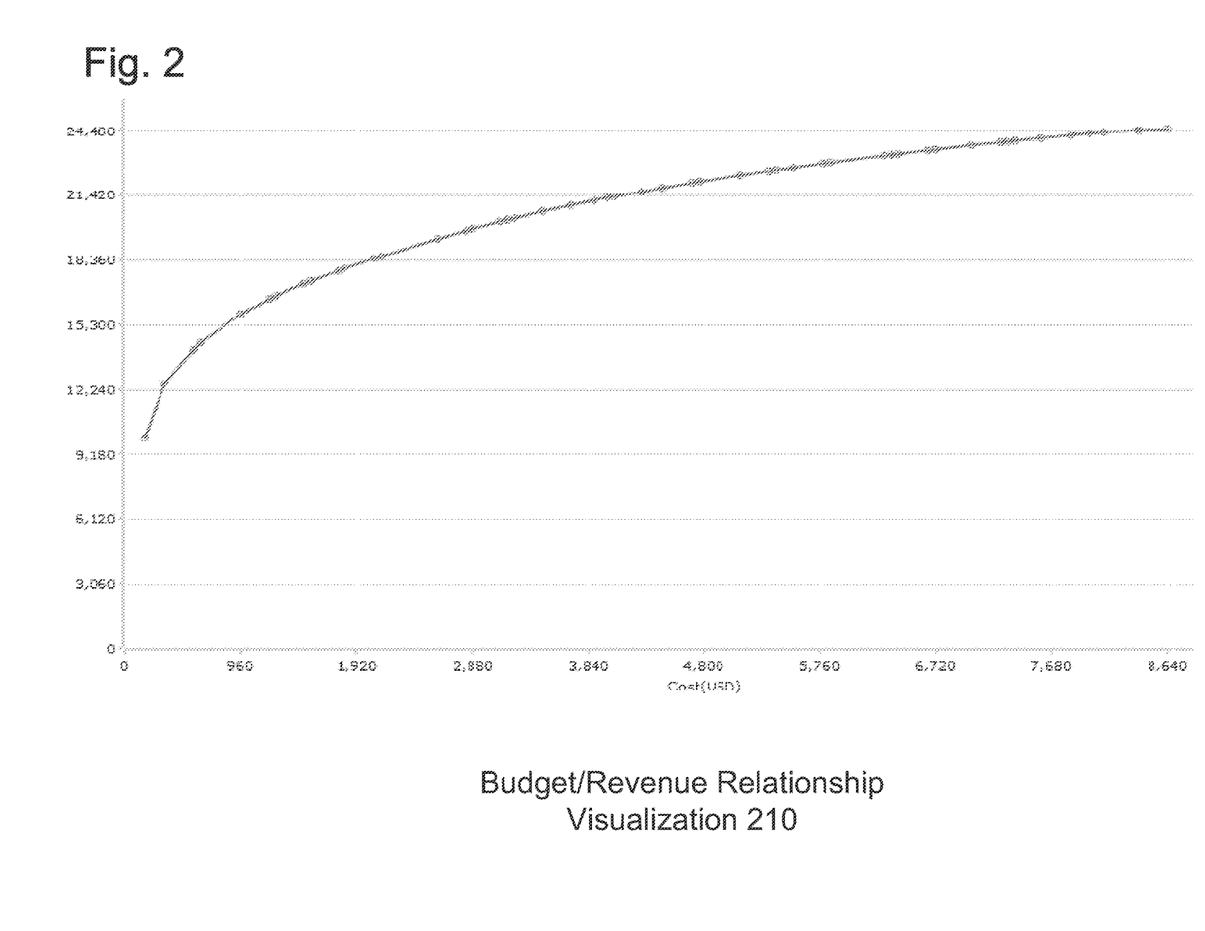
FIG. 2 is an example visualization of predicted revenue according to different budget allocations.

In various embodiments, bidding strategies and/or objective values obtained by finding solutions to objective functions may be output to a user in the form of a visualization. In various embodiments, multiple solutions to the objective problem may be generated based on changing inputs or changing constraints. For example, FIG. 2 illustrates an example visualization of predicted revenue based on various budget amounts. The budget/revenue relationship visualization 210 may show an advertiser what revenue is predicted for the advertiser based on various advertising budget amounts. Thus, in the example illustrated, predicted revenue increases as advertising budgets increase. However, the relationship may not be linear, as illustrated, for example, in FIG. 2. In alternative visualizations, different bidding strategies may be displayed based on changes to inputs or constraints.

Figure 3:
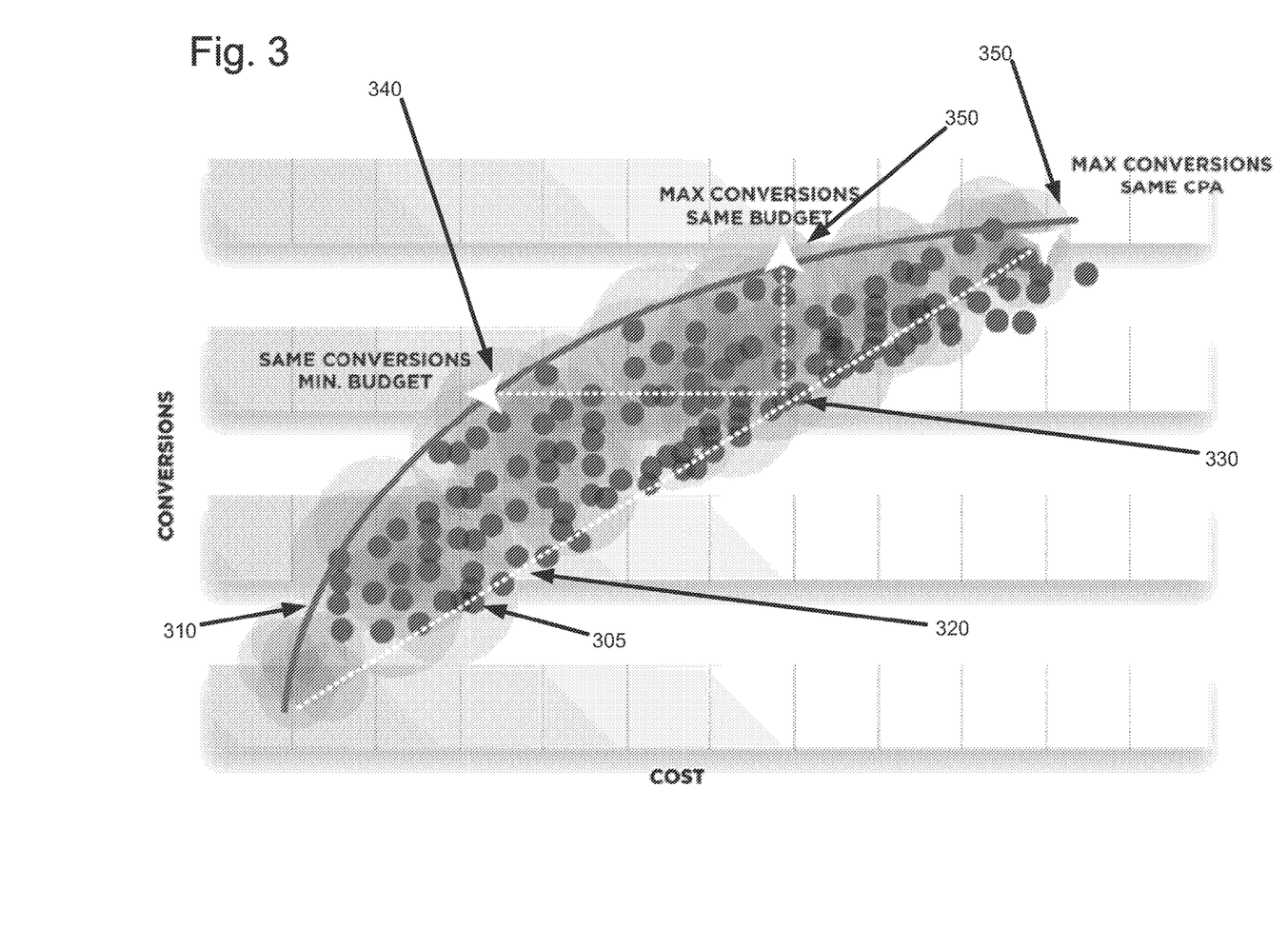
FIG. 3 is an example visualization of predicted conversions according to different budget allocations.
Figure 4:
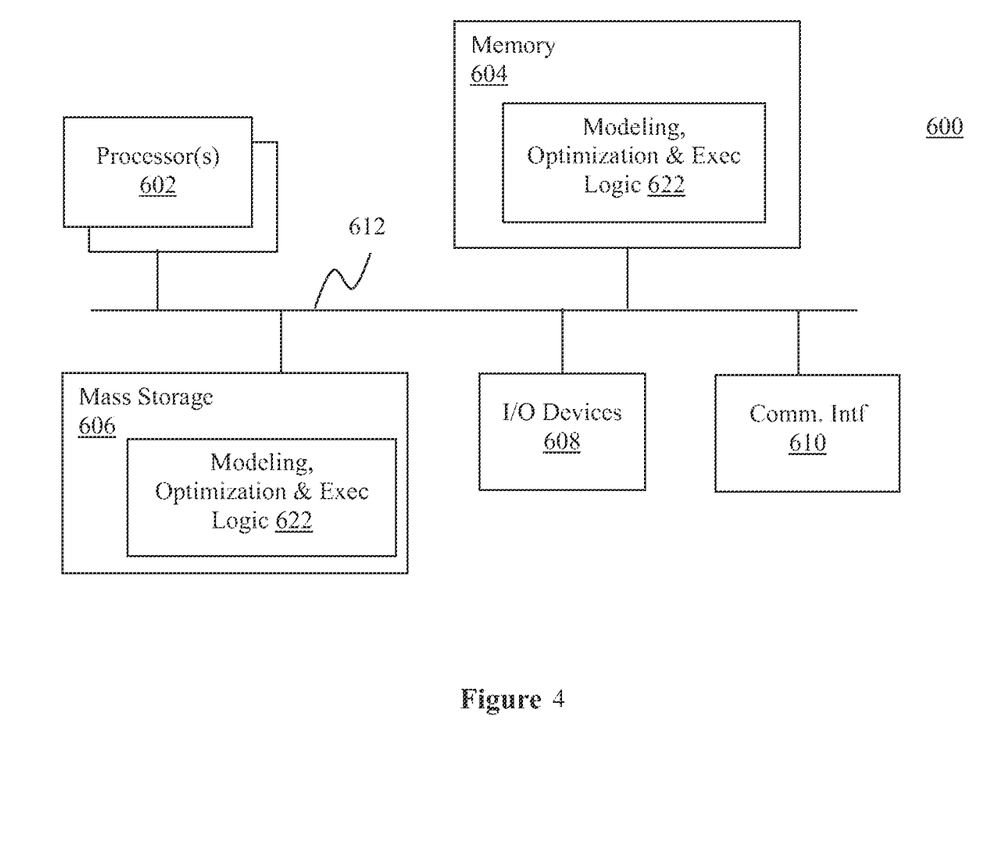
FIG. 4 is a block diagram illustrating a computing device suitable for use to practice the present invention.

In another Example, FIG. 3 illustrates an example visualization of predicted conversions based on various budget amounts. The cost to conversion relationship, represented by line 310 shows a relationship that is non-linear, as differentiated from the linear relationship 320, which shows a constant cost-per-conversion relation, also known as "CPA".

In between the two illustrated relationships are various points predicting pairs of conversion rates and cost, such as point 305. As the visualization of FIG. 3 illustrates, in various embodiments, a user may be shown how changes made using the bidding strategy generation techniques described herein may result in different benefits to an advertiser. For example, starting from a point 330 on the constant cost-per-conversion line 320, a bidding strategy may be generated that minimizes an advertiser's budget while maintaining the same number of conversions. This would result in the a conversion level that is represented by point 340. Conversely, a bidding strategy may be generated that, for a constant budget, increases conversions, such as at point 350. In another example, a bidding strategy may be generated that, increases conversions as much as possible while maintaining a constant CPA, such as at point 360. In alternative visualizations, different bidding strategies may be displayed based on changes to inputs or constraints.

Making a Market in Marketing

The present invention may also be employed to create a market in marketing options, where sites ("the sellers"), with marketable visitors can ask varying rates for different advertising options and the organizations that need those visitors ("the buyers") bid different prices for the different options depending on the value they associate with the visitor. An entity can then play the role of the market maker in such a market by matching the buyers with the sellers for a commission.

The market maker can match buyers and sellers by simply presenting the various options to the buyers and sellers and let them make their decisions individually. The market also supports the role of a broker, who can also take the objectives of one or multiple sellers to optimize their marketing objectives for a commission. For paid listings on search engines, the price for a click from a certain position on the search results page for a certain keyword depends on the price that different "buyers" are willing to bid for that position. This can sometimes create bidding wars between buyers that result in the buyers collectively paying a high price for their clicks. A broker, by pulling together the different competing buyer entities, can collectively optimize the different objectives and requirements thereby providing a lower cost solution to the buyers that meet the buyers' objectives.

Exemplary System

FIG. 3 illustrates an example computing system/device suitable for use to practice the present invention, in accordance with one embodiment. As shown, computing system/device 600 includes one or more processors 602, and system memory 604. Additionally, computing system/device 600 includes mass storage devices 606 (such as diskette, hard drive, CDROM and so forth), input/output devices 608 (such as keyboard, cursor control and so forth) and communication interfaces 610 (such as network interface cards, modems and so forth). The elements are coupled to each other via system bus 612, which represents one or more buses. In the case of multiple buses, they are bridged by one or more bus bridges (not shown).

Each of these elements performs its conventional functions known in the art. In particular, system memory 604 and mass storage 606 may be employed to store a working copy and a permanent copy of the programming instructions implementing one or more aspects of the earlier described teachings to practice the present invention, i.e. the modeling, the optimization, the bidding and so forth. The programming instructions may be implemented in assembler instructions supported by processor(s) 602 or high level languages, such as C, that can be compiled into such instructions. The communication to place the bids may be implemented in any one of a number of proprietary or open communication/transaction protocol, including but are not limited to HTTP and TCP/IP.

The permanent copy of the programming instructions may be placed into permanent storage 606 in the factory, or in the field, through e.g. a distribution medium (not shown) or through communication interface 610 (from a distribution server (not shown)).

Except for the modeling, optimization, and bidding logic, the constitution of these elements 602-612 are known, and accordingly will not be further described.

Epilog

Although specific embodiments have been illustrated and described herein for purposes of description of the preferred embodiment, it will be appreciated by those of ordinary skill in the art that a wide variety of alternate and/or equivalent implementations may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof

What is claimed is:

1. A method for determining a bidding strategy for placing a plurality of bids for a plurality of marketing options, the method comprising:
   performing, by one or more computing devices:
      determining empirical data associated with marketing options based on performance metrics of the marketing options and based on observation of web site traffic from user devices to computing resources that expose the user devices to the marketing options;
      generating a predictive model that comprises one or more statistical models, wherein the predictive model is generated based on the empirical data;
      determining at least one modeling parameter for the predictive model, wherein the at least one modeling parameter is variable and is associated with at least one of a user characteristic or a marketing option characteristic;
      determining at least one objective for the predictive model to optimize;
      receiving a trigger event to optimize the predictive model, the trigger event associated with web site traffic to a set of web sites;
      optimizing the predictive model by solving an objective function based in part on the at least one modeling parameter, the at least one objective, and at least one constraint; and
      determining, in real time relative to the trigger event, the bidding strategy based on the optimization of the predictive model, wherein the bidding strategy comprises a set of the marketing options that results in the optimization in accordance with the at least one modeling parameter, the at least one objective, and the at least one constraint, the set of the marketing options used in connection with subsequent web site traffic to the set of web sites.

2. The method of claim 1, further comprising placing the plurality of bids for the plurality of marketing options in accordance with the bidding strategy.

3. The method of claim 2, wherein determining at least one objective for the predictive model to optimize includes determining a plurality of objectives for a plurality of web sites or auctions, and wherein placing the plurality of bids for the plurality of marketing options in accordance with the bidding strategy includes placing bids on different web sites.

4. The method of claim 1, wherein the at least one objective to optimize is one of profits, conversions, revenue and traffic.

5. The method of claim 1, wherein performing, by the one or more computing devices, further comprises:
   determining a constraint for the predictive model, wherein the constraint is selected from the group consisting of money spent on marketing, cost per click, and cost per conversion; and
   wherein optimizing the predictive model based in part on the at least one modeling parameter and the at least one objective further includes configuring the predictive model based upon the at least one constraint.

6. The method of claim 1, wherein the at least one modeling parameter is one of cost of acquisition, interests and likes, geographic location, and behavioral information.

7. The method of claim 1, wherein determining at least one objective for the predictive model to optimize includes determining objectives for multiple web sites or auctions and wherein placing the plurality of bids for the plurality of marketing options in accordance with the determined bidding strategy includes placing bids on different web sites.

8. The method of claim 1, further comprising:
   configuring a graphical user interface to receive updated model parameters;
   performing a second optimization of the at least one objective in accordance with the updated model parameters;
   using results of the second optimization to determine a second bidding strategy.

9. The method of claim 1, further comprising outputting results of the optimization as a visualization.

10. A non-transitory computer-readable storage medium storing program instructions executable on a computer to implement a bidding strategy system configured for:
   determining empirical data associated with marketing options based on performance metrics of the marketing options and based on observation of web site traffic from user devices to computing resources that expose the user devices to the marketing options;
   generating a predictive model that comprises one or more statistical models, wherein the predictive model is generated based on the empirical data;
   determining at least one modeling parameter for the predictive model, wherein the at least one modeling parameter is variable and is associated with at least one of a user characteristic or a marketing option characteristic;
   determining at least one objective for the predictive model to optimize;
   receiving a trigger event to optimize the predictive model, the trigger event associated with web site traffic to a set of web sites;
   optimizing the predictive model by solving an objective function based in part on the at least one modeling parameter, the at least one objective, and at least one constraint; and
   determining, in real time relative to the trigger event, a bidding strategy based on the optimization of the predictive model, wherein the bidding strategy comprises a set of the marketing options that results in the optimization in accordance with the at least one modeling parameter, the at least one objective, and the at least one constraint, the set of the marketing options used in connection with subsequent web site traffic to the set of web sites.

11. The non-transitory computer-readable storage medium of claim 10, wherein the at least one objective to optimize is one of profits, conversions, revenue and traffic.

12. The non-transitory computer-readable storage medium of claim 10 further comprising determining a constraint for the predictive model wherein the constraint is one of money spent on marketing, cost per click and cost per conversion and wherein optimizing the predictive model based in part on the at least one modeling parameter and the at least one objective further includes configuring the predictive model based upon the constraint.

13. The non-transitory computer-readable storage medium of claim 10, wherein the at least one modeling parameter is one selected from cost of acquisition, interests and likes, geographic location and behavioral information.

14. The non-transitory computer-readable storage medium of claim 10, further comprising placing a plurality of bids for a plurality of marketing options in accordance with the bidding strategy including placing bids on different web sites and wherein the predictive model specifies model objectives for multiple web sites or auctions.

15. The non-transitory computer-readable storage medium of claim 10, wherein performing the optimization includes performing the optimization in real time to determine the bidding strategy.

16. The non-transitory computer-readable storage medium of claim 10, further comprising outputting results of the optimization as a visualization.

17. A system, comprising:
a non-transitory computer-readable storage medium; and
one or more processors coupled to the non-transitory computer-readable storage medium, wherein the non-transitory computer-readable storage medium stores program instructions executable by the one or more processors to implement a bidding strategy system comprising:
a modeling component for:
determining empirical data associated with marketing options based on performance metrics of the marketing options and based on observation of web site traffic from user devices to computing resources that expose the user devices to the marketing options;
generating a predictive model that comprises one or more statistical models, wherein the predictive model is generated based on the empirical data;
determining at least one modeling parameter for the predictive model, wherein the at least one modeling parameter is variable and is associated with at least one of a user characteristic or a marketing option characteristic; and
an optimizer component for:
determining at least one objective for the predictive model to optimize;
receiving a trigger event to optimize the predictive model, the trigger event associated with web site traffic to a set of web sites;
optimizing the predictive model by solving an objective function based in part on the at least one modeling parameter, the at least one objective, and at least one constraint; and
determining, in real time relative to the trigger event, a bidding strategy based on the optimization of the predictive model, wherein the bidding strategy comprises a set of the marketing options that results in the optimization in accordance with the at least one modeling parameter, the at least one objective, and the at least one constraint, the set of the marketing options used in connection with subsequent web site traffic to the set of web sites.

18. The system of claim 17, wherein the optimizer component is further for determining a constraint for the predictive model wherein the constraint is one selected from money spent on marketing, cost per click and cost per conversion; and wherein the optimizing the predictive model based in part on the at least one modeling parameter and the at least one objective further includes configuring the predictive model based upon the constraint.

19. The system of claim 17, wherein the predictive model specifies model objectives for multiple web sites or auctions and wherein placing a plurality of bids for a plurality of marketing options in accordance with the bidding strategy includes placing bids on different web sites.

20. The method of claim 1, wherein the trigger event comprises at least one of: a marketer request for the optimization or a user device access to a computing resource that exposes the user device to the marketing options.

* * * * *